United States Patent Office 3,047,791
Patented July 31, 1962

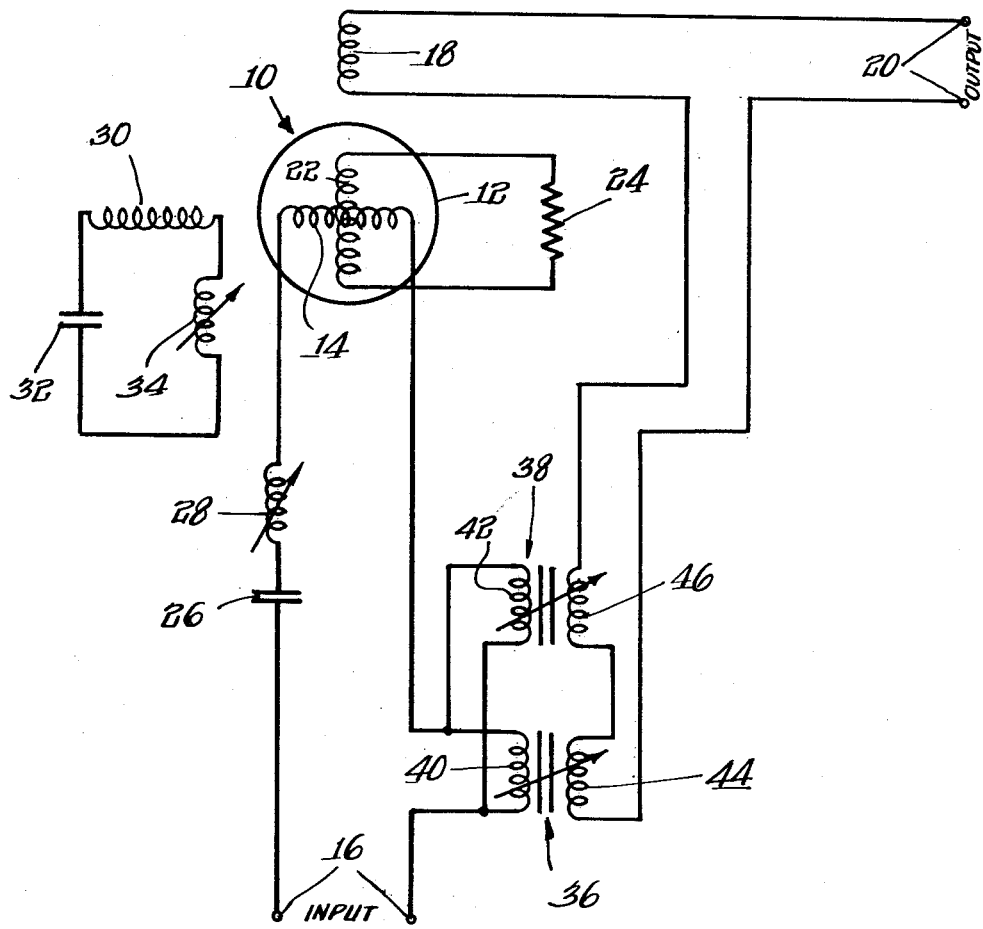

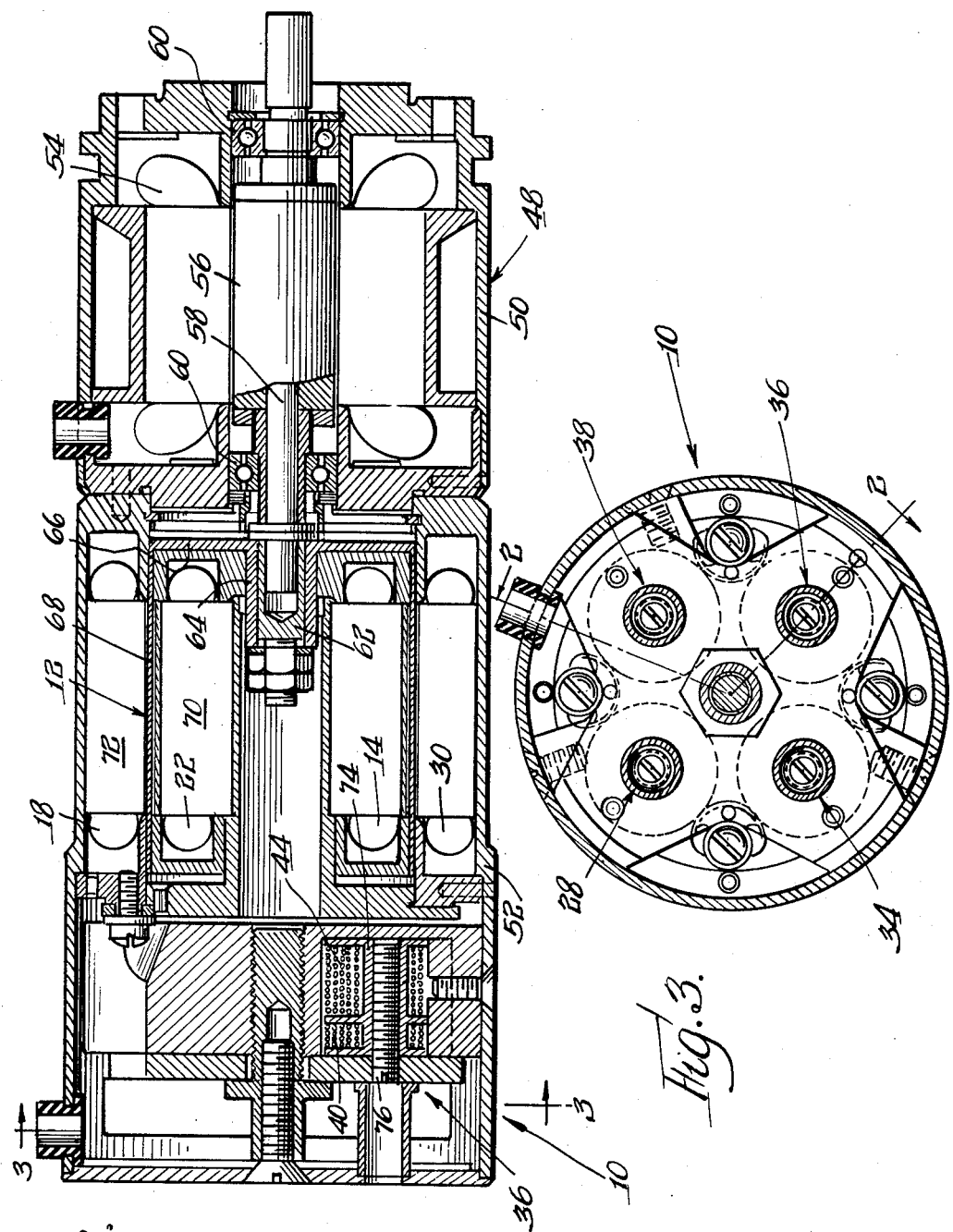

3,047,791
TACHOMETER GENERATOR
Kurt Burian, Highland Park, Ill., assignor to G-M Laboratories Inc., Chicago, Ill., a corporation of Illinois
Filed Oct. 28, 1959, Ser. No. 849,277
11 Claims. (Cl. 322—34)

This invention is concerned with a temperature compensated tachometer generator.

Tachometer generators of the drag-cup type are well known, as are most of the characteristics thereof. In general, a drag-cup tachometer generator includes a stator with two windings thereon, an input winding and an output winding. These two windings are at 90° to one another electrically. Since the windings are at 90°, the magnetic field produced by an alternating current in the input winding does not induce any current in the output winding. However, a cylindrical drag-cup of conducting, non-magnetic material, usually aluminum, causes development of a cross field when the cup is rotated, and this induces a voltage in the output winding. The voltage induced in the output winding depends on the speed at which the drag-cup is rotated, and the output voltage therefore provides a measurement of the speed of rotation of the drag-cup. Desirably, the relation of output voltage to speed of rotation should be linear, and should be independent of temperature.

Tachometer generators are widely used in aircraft and in missiles, and hence are subject to use over extreme temperature ranges. Unfortunately, the gradient (i.e., the volts output per 1,000 r.p.m.) of all tachometer generators changes with temperature. An otherwise high-quality tachometer generator may have an output gradient which varies on the order of fifteen percent with a 60° C. change in temperature. This obviously is a very high error. When it is realized that a tachometer generator is used for integrating instantaneous speed, and that even an error of one-tenth of one percent may put a missile many miles off target in one hour, it becomes apparent that a fifteen percent error cannot be tolerated.

Various schemes have been utilized heretofore to compensate for the change in gradient with temperature. Tachometer generators have been built with a temperature sensing heating element positioned around or inside the unit. This heating element is designed to maintain the temperature of the tachometer generator unit constant at the highest temperature level to be encounered in operation. Relatively large amounts of power must be supplied for this purpose. Modulation of this power causes considerable switching surges which under certain conditions cause malfunctions of the overall system. Furthermore, the heating element and the temperature sensitive control therefor, and the power supply therefor add considerably to the weight and bulk to be carried, perhaps more than can be tolerated in a given airborne or missile installation.

Another approach heretofore used utilizes an external compensating network which senses the temperature and compensates the input accordingly. This approach is quite complicated, costly and bulky, and has not proved entirely satisfactory.

Accordingly, it is an object of this invention to provide a novel and superior system for controlling the gradient of a tachometer generator with changes in temperature. More particularly, it is an object of this invention to provide, in a tachometer generator, a system for maintaining the gradient substantially constant with changes in temperature, which system is relatively simple, inexpensive, and light in weight and conserving of space.

A further object of this invention is to provide means for controlling the phase angle in a tachometer generator.

Yet another object of this invention is to provide means in a tachometer generator for compensating the output for unavoidable manufacturing variations.

Other and further objects and advantages of the present invention will be apparent from the following description when taken in connection with the accompanying drawings wherein:

FIG. 1 is a schematic wiring diagram of a tachometer generator constructed in accordance with the principles of this invention;

FIG. 2 is a longitudinal sectional view through a tachometer motor-generator set as taken along the line 2—2 in FIG. 3; and FIG. 3 is a cross sectional view along the line 3—3 in FIG. 2.

Referring first to FIG. 1, there will be seen a schematic representation of a tachometer generator 10. The tachometer generator has an inner stator and an outer stator, and a drag-cup schematically indicated at 12. The inner stator carries an input winding 14 which is connected to input connections 16 in a manner hereinafter to be described. The outer stator is provided with an output winding 18 at ninety electrical degrees to the input winding 14, and connected to the output terminals 20 in a manner hereinafter to be described. Since the output winding 18 is at right angles to the input winding 14, there is no voltage induced in the output winding when the drag-cup 12 is at rest, it being understood that the input winding 14 is energized with alternating current voltage. When the drag-cup 12 rotates, a cross magnetic field appears which is proportional to the speed (for any given temperature) and which is perpendicular to the input winding 14, thereby inducing a voltage in the output winding 18. As noted heretofore, the output voltage and gradient vary with temperature. This is due at least in part to the variations in resistance in the windings 18 and 14 and in the drag-cup 12 with temperature.

A second or auxiliary winding 22 is placed on the inner stator in space quadrature with the first winding 14. The auxiliary winding 22 has a resistor 24 connected across it. This resistor is of rather low value, being in the range of zero to one hundred ohms, and selected during manufacture as will be mentioned hereinafter. The resistor 24 is physically located inside the tachometer generator, and therefore is at the same temperature as the remainder of the tachometer generator. Further, the resistor 24 is temperature sensitive.

As will be apparent, no voltage is induced in the auxiliary winding 22 when the drag-cup is stationary. However, when the cross magnetic field is developed by rotation of the drag-cup, the auxiliary winding 22 senses this field the same as the outside stator winding 18, and a voltage is developed therein. A current flows through the auxiliary winding 22 and through the resistor 24, and develops ampere-turns in a direction opposite to that of the cross field. Consequently, the total magnetic flux in the cross field is reduced, and the voltage induced in the outside stator winding 18 is reduced to less than that which it would be if the winding 22 were not present.

At low temperatures, the cross field is strong, the voltage induced in winding 22 is high, the resistance of the winding 22 and of the resistor 24 is low, and the resultant current flowing in the auxiliary winding 22 is high. This tends to counteract the cross field strongly, and the output voltage of the outer stator winding 18 is therefore substantially lower than would be obtained without the winding 22.

However, at higher temperatures, the cross field is weakened due to the higher resistance of the windings and of the drag-cup. Thus, the voltage in the auxiliary winding 22 is lower. Furthermore, the resistance of the auxiliary winding 22 is higher and the resistance of the resistor 24 is higher. Consequently, the current flowing in the auxiliary winding 22 is reduced. The cross field therefore is only moderately weakened. Thus, the resultant field, and therefore the output voltage across the outer stator winding 18 tend to be quite close to the output voltage produced at lower temperatures. In fact, in tests on a tachometer generator built in accordance with the principles of the invention as disclosed up to this point, the gradient was found to vary rather significantly less than one-tenth of one percent over a 60° C. range. Accuracy is therefore improved over fifteen thousand percent.

It is of utmost importance in the applications of tachometer generators that the gradient not only must stay constant over a wide temperature range, but also must have a predetermined value. Because of manufacturing variations unavoidable in the production of the essential components of tachometer generators, it is impossible to produce tachometer generators with exactly the same output gradient. Accordingly, means is presented herein which permits trimming of the output gradient to the exact value required. Similarly, the phase angle must be kept constant at a predetermined value.

Accordingly, in accordance with the preceding paragraph, a capacitor 26 and a variable inductor 28 are placed in series with one another between the input terminals 16 and the input winding 14 of the tachometer generator. Furthermore, a second auxiliary winding 30 is provided on the tachometer generator, this time on the outer stator and aligned with the input winding 14. A capacitor 32 and a variable inductor 34 are connected in series with one another across the second auxiliary winding 30.

Adjustment of the inductor 34 effects adjustment of the value of the output gradient without appreciably affecting the phase angle. Conversely, adjustment of the inductor 28 effects adjustment of the phase angle without appreciably affecting the output gradient.

In addition to effecting control of the gradient and phase angle, the second auxiliary winding 30 and associated elements produce a bucking effect on the input winding 14. This effect varies with temperature, and through rotation of the drag-cup 12 produces a further compensating effect on the output winding 18. Surprisingly enough, a synergistic effect is produced. The components associated with the winding 30 can be adjusted for minimum gradient variation with temperature independently of adjustment of the winding 22 and the resistor 24, and the winding 22 and resistor 24 can be adjusted independently of the winding 30 and associated components, and the total effect of the two windings 22 and 30 and associated components together is much greater than the sum of the two.

Heretofore it has been observed that there is no output voltage when the drag-cup is at rest. Desirably, this is correct, and it is very nearly true. In practical considerations, however, there is usually a certain amount of residual voltage in the output, even with the drag-cup at rest. This is reduced to a minimum by rotating the inner stator relative to the outer stator. A zero residual voltage cannot be generally obtained, and although the point at which it is a minimum is independent of the direction of rotation of the stator, the gradient is usually different for one direction of rotation from what it is in the opposite direction. Accordingly, the usual practice is to pick a compromise point, giving a near minimum residual voltage and substantially equal gradients for rotation in either direction.

A further refinement of the present invention reduces the residual output voltage to zero. Specifically, two small variable transformers 36 and 38 are provided. The primaries 40 and 42 of the two transformers are connected in parallel with one another, and in series with the input of the tachometer generator input winding 14. The secondary windings 44 and 46 are connected in series with one another, and in series with the output 20. The output of the two transformers 36 and 38 is adjusted by threading a small core in and out of each of the two transformers respectively, whereby the output of the two small transformers is added into the output voltage of the tachometer generator (or subtracted therefrom). Theoretically only one such transformer would be necessary, but for the space available in a given tachometer generator, two transformers do a better job than one.

Reference now should be had to FIGS. 2 and 3 for a physical embodiment of the mechanisms shown electrically in FIG. 1. Thus, there is shown a tachometer generator 10 combined as a part of a motor-tachometer generator set embodying also a motor 48. The motor is one the speed of which is to be measured, and may be a servomotor. The motor includes a casing or housing 50 joined to the casing or housing 52 of the tachometer generator. The motor includes field windings 54, which may comprise two fields in the case of a tachometer generator, and further includes a rotor 56 mounted on a shaft 58 journaled in bearings 60 carried by the housing or casing 48. One end of the shaft conveniently extends out of the housing or casing, as shown, and the opposite end is drivingly connected to a shaft 62 mounting the drag-cup 12. The drag-cup 12 comprises a hub 64 mounted on the shaft 62, a radially extending disc or flange 66 integral therewith, and an axially extending cylinder 68, which conveniently is drawn from and is integral with the flange or disc 66. As will be seen, the cylinder 12 of the drag-cup extends between the inner stator 70 and the outer stator 72.

At the lower left corner of FIG. 2, the small transformer 36 will be seen to include an insulating bobbin 74 upon which the windings 40 and 44 are disposed, and through which a screw 76 is threadedly adjusted. This screw is made of magnetically susceptible material, and comprises the core of the transformer. Threading it in or out varies the coupling of the coils 40 and 44, as will be obvious. The transformer 38 is similarly constructed, as are the inductances 28 and 24, except that these inductances, of course, comprise only a single winding each.

It will now be apaprent that there has been herein described a superior tachometer generator which is temperature compensated through the provision of an auxiliary winding producing a bucking cross field, the strength of which varies with temperature, due to the temperature sensitive nature of the cross field auxiliary winding and of the circuit means connected therewith, including the wires, and including the resistor 24. Of course, it will be understood that the resistor 24 could have nominally zero resistance. It will be realized that even when the resistance is nominally zero, that there will be some finite, although very small resistance, and that which will change with temperature, as will the resistance of the remainder of the wire "short circuiting" the winding 22. The constancy of gradient with changes in temperature is further improved by the provision of the auxiliary winding 30 bucking the energizing field, and in fact the cumulative effect of the two auxiliary fields has been found to be much greater than the sum of the two, both being temperature sensitive.

Provision also is made for trimming of the output gradient, to compensate for differences in manufacture between various tachometer generators, and provision also is made for adjustment of the phase angle of the output, preferably to zero. Further, provision is made for balancing out residual output voltage.

All of this is accomplished at relatively small cost, without undue bulk, and without consuming an undue amount of power.

The specific embodiment of the invention as herein shown and described is for illustrative purposes only. Various changes in structure will no doubt occur to those skilled in the art, and will be understood as forming a part of the present invention insofar as they fall within the spirit and scope of the appended claims.

The invention is claimed as follows:

1. A compensated tachometer generator comprising a stator, a rotor, means mounting said rotor for rotation relative to said stator, an energizing winding on said stator, an output winding on said stator, said windings and said rotor being inherently temperature sensitive, and a compensating auxiliary winding electrically isolated from and in inductive relation to one of the previously mentioned windings and in bucking flux relation thereto, said auxiliary winding being temperature sensitive and having the ends thereof connected by temperature sensitive electrically conductive means having a temperature coefficient of resistance in the same sense as said windings and rotor.

2. A tachometer generator as set forth in claim 1 wherein the ends of the auxiliary winding are connected together through a temperature sensitive resistor.

3. A compensated tachometer generator comprising a stator, a rotor in the form of a drag-cup, means mounting said drag-cup for rotation relative to said stator, an energizing winding on said stator, an output winding on said stator and disposed at 90° to said energizing winding, said windings and said drag-cup being inherently temperature sensitive, and a compensating auxiliary winding electrically isolated from and parallel to and in inductive relation to one of the previously mentioned windings and in bucking flux relation thereto, said auxiliary winding being temperature sensitive and having the ends thereof connected by temperature sensitive electrically conductive means having a temperature coefficient of resistance in the same sense as said windings and rotor.

4. A tachometer generator as set forth in claim 3 and further including a second auxiliary winding at 90° to the first auxiliary winding and parallel to the other of the first two mentioned windings, the second auxiliary winding being in inductive bucking relation with the other of the first two mentioned windings and electric impedance means connected across said second auxiliary winding.

5. A compensated tachometer generator comprising a stator, a rotor, means mounting said rotor for rotation relative to said stator, an energizing winding on said stator, input terminal means, electric means including variable impedance means connecting said input terminal means and said energizing winding, an output winding on said stator, a compensating auxiliary winding on said stator in inductive relation to one of the previously mentioned windings, and means including variable impedance means connected across sad auxiliary winding, said two variable impedance means controlling the gradient and phase of voltage developed in the output winding.

6. A compensated tachometer generator comprising a stator, a drag-cup, means mounting said drag-cup for rotation relative to said stator, an energizing winding on said stator, input terminal means, impedance means connecting said input terminal means to said energizing winding and including a capacitor and an inductor, one of which is variable, an output winding on said stator, said windings and said rotor being inherently temperature sensitive, a compensating auxiliary winding in inductive relation to one of the previously mentioned windings, said auxiliary winding being temperature sensitive and having the ends thereof connected by temperature sensitive electrical conducting means, a second auxiliary winding in inductive relation to the other of the first two mentioned windings, and electric circuit means connected across the second auxiliary winding including an inductance and a capacitor, one of which is variable.

7. A compensated tachometer generator comprising a stator, a rotor, means mounting said rotor for rotation relative to said stator, an energzing winding on said stator, an output winding on said stator at right angles to said energizing winding, a stationary compensating auxiliary winding electrically isolated from and in inductive relation to one of the previously mentioned windings and disposed on said stator substantially parallel to the winding with which it is in inductive relation and at right angles to the other winding, and electrically conductive means having a positive temperature coefficient of resistance connected across said auxiliary winding.

8. A compensated tachometer generator comprising a stator, a drag-cup, means mounting said drag-cup for rotation relative to said stator, an energizing winding on said stator, input terminal means, electric circuit means connecting said input terminal means and said energizing winding, said electric circuit means including an inductor and a capacitor, one of which is variable, and further including the primary windings of a pair of transformers, said pair of primary windings being connected in parallel with one another and in series between the input terminal means and the energizing winding, an output winding on said stator, output terminal means, electric circuit means connecting said output winding and said output terminal means including the secondary windings of said transformers, said secondary windings being connected in series with one another and in series between the output winding and the output terminal means, a compensating auxiliary winding in inductive relation to one of the energizing and output windings and not in inductive relation with the other thereof, and electric circuit means connected across said auxiliary winding and including an inductor and a capacitor, one of which is variable.

9. A tachometer generator comprising a stator, a drag-cup, means mounting said drag-cup for rotation relative to said stator, an energizing winding on said stator, input terminal means, electric circuit means interconnecting said input terminal means and said energizing winding and including a pair of transformers, the primary windings of said transformers being connected in parallel with one another and in series between the input terminal means and the energizing windings, an output winding on said stator and at 90° relative to said energizing winding, output terminal means, electric circuit means interconnecting said output winding and said output terminal means and including the secondary windings of said pair of transformers, the secondary windings being connected in series with one another and in series between said output winding and said output terminal means, and an auxiliary winding on said stator in inductive relation to one of the energizing and output windings and not in inductive relation to the other thereof.

10. A tachometer generator comprising a stator, a rotor, means mounting said rotor for rotation relative to said stator, an energizing winding on said stator, input terminal means, electric circuit means interconnecting said input terminal means and said energizing winding and including a pair of transformers, the primary windings of said transformers being connected in parallel with one another and in series between the input terminal means and the energizing winding, an output winding on said stator, output terminal means, and electric circuit means interconnecting said output winding and said output terminal means and including the secondary windings of said pair of transformers, said secondary windings being connected in series with one another and in series between said output winding and said output terminal means.

11. A tachometer generator comprising a stator, a rotor, means mounting said rotor for rotation relative to said stator, an energizing winding on said stator, input terminal means, electric circuit means interconnecting said input terminal means and said energizing winding and including transformer means having primary winding means and secondary winding means, the primary winding means being connected in series with the input terminal means and the energizing winding, an output winding on said stator, output terminal means, and electric circuit means interconnecting said output winding and said output terminal means and including said secondary winding means.

References Cited in the file of this patent

UNITED STATES PATENTS

| | | |
|---|---|---|
| 2,759,116 | Glass | Aug. 14, 1956 |
| 2,889,475 | Emerson | June 2, 1959 |